US012737982B2

(12) United States Patent
Cantero Clares et al.

(10) Patent No.: US 12,737,982 B2
(45) Date of Patent: Sep. 15, 2026

(54) COMPUTER SYSTEM AND METHOD FOR GENERATING A 3D INTERACTIVE SCENE

(71) Applicant: Acer Incorporated, New Taipei City (TW)

(72) Inventors: Sergio Cantero Clares, New Taipei City (TW); Shih-Hao Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 149 days.

(21) Appl. No.: 18/588,325

(22) Filed: Feb. 27, 2024

(65) Prior Publication Data

US 2025/0272918 A1 Aug. 28, 2025

(51) Int. Cl.

*G06T 17/20* (2006.01)
*G06F 3/01* (2006.01)
*G06T 7/50* (2017.01)
*G06T 15/04* (2011.01)

(52) U.S. Cl.

CPC .............. *G06T 17/20* (2013.01); *G06F 3/012* (2013.01); *G06T 7/50* (2017.01); *G06T 15/04* (2013.01); *G06T 2200/24* (2013.01); *G06T 2207/10016* (2013.01)

(58) Field of Classification Search

CPC ........... G06T 17/20; G06T 7/50; G06T 15/04; G06T 2200/24; G06T 2207/10016; G06F 3/012

See application file for complete search history.

(56) References Cited

U.S. PATENT DOCUMENTS 8,015,509 B2 * 9/2011 Karstens ............... G06F 3/0481 715/764
10,311,589 B2 * 6/2019 Meyer ....................... G06T 7/77
10,325,402 B1 * 6/2019 Wang .................... G06T 15/503
10,499,031 B2 * 12/2019 Ayari ..................... G06N 20/00
10,984,589 B2 * 4/2021 Venshtain ............... G06T 17/20
11,095,854 B2 * 8/2021 Venshtain ............... G06T 7/593
2006/0067573 A1 * 3/2006 Parr ..................... G06V 40/169 382/154
2018/0350134 A1 * 12/2018 Lodato .................... G06T 17/20
2019/0164346 A1 * 5/2019 Kim ...................... G06T 15/005
2020/0111255 A1 * 4/2020 Brodsky .............. G02B 27/017
2020/0122040 A1 * 4/2020 Juliani, Jr. ........... G06V 10/764
2020/0134911 A1 * 4/2020 van Hoff ................. G06T 7/292
2020/0213572 A1 * 7/2020 Katz .................... H04N 13/183
2021/0065454 A1 * 3/2021 Goodrich ............... G06N 20/00
2021/0065464 A1 * 3/2021 Goodrich ................ G06T 15/50
2021/0287430 A1 * 9/2021 Li ............................. G06T 7/74
2021/0360199 A1 * 11/2021 Oz ......................... H04N 7/147

(Continued)

FOREIGN PATENT DOCUMENTS

EP 3471057 B1 * 1/2022 ............... G06T 7/55

*Primary Examiner* — William Lu

(74) *Attorney, Agent, or Firm* — McClure, Qualey & Rodack, LLP

(57) ABSTRACT

A computer-implemented method for generating a 3D interactive scene is provided. The method includes executing a first process based on the 2D source image. The first process includes estimating a corresponding depth map for the 2D source image, creating a 3D mesh based on the estimated depth map, and executing a first loop iteratively to present the 3D interactive scene based on the 3D mesh and user's head pose information.

22 Claims, 10 Drawing Sheets

SP50
SL50
load the video frame of the 2D source video from the storage — S504
load the corresponding depth frame for the video frame from the storage unit — S505
update the 3D mesh based on the depth frame — S506
obtain head pose information — S507
calculate a set of head coordinates based on the head pose information — S508
construct a transformation matrix based on the calculated set of head coordinates — S509
project each vertex of the 3D mesh onto a screen coordinate of an onscreen image using the transformation matrix — S510
color the onscreen image based on the texture information corresponding to the loaded video frame — S511
cause the display unit to display the onscreen image — S512
S503 initialize the 3D mesh
S502 depth video existed? Yes / No
background inference thread — BIT

(56) References Cited

U.S. PATENT DOCUMENTS

2024/0404104 A1* 12/2024 Revaud .................. G06V 20/70
2025/0069333 A1* 2/2025 Cantero Clares ......... G06T 5/70
2025/0076969 A1* 3/2025 Xiong ..................... G06F 3/013
2025/0078393 A1* 3/2025 Tan ......................... G06T 17/00
2025/0239030 A1* 7/2025 Xiong ................... G06T 17/205
2025/0264971 A1* 8/2025 Moiron ................... G06F 9/452

* cited by examiner

10A

FP20

SP50

RIT estimate the corresponding depth frame for the video frame

S801 perform intraframe depth stabilization for the estimated depth frame

S802

COMPUTER SYSTEM AND METHOD FOR GENERATING A 3D INTERACTIVE SCENE

BACKGROUND OF THE INVENTION

Field of the Invention

The present disclosure relates in general to image processing and three-dimensional (3D) visualization techniques, and, in particular, to a method for generating a 3D interactive scene.

Description of the Related Art

Current approaches to the generation and presentation of 3D scenes commonly rely on the principle of binocular parallax. This involves presenting slightly different images to the right and left eyes, prompting the brain to interpret the resulting parallax (i.e., the varying views from each eye) as a sense of depth perception. However, achieving a 3D effect using binocular parallax typically necessitates the use of specialized display devices, such as autostereoscopic display devices or wearable devices like 3D/VR glasses or headgear. In the absence of such dedicated 3D display devices, users face limitations in experiencing 3D scenes on widely-used display devices designed primarily for 2D image presentation, without the addition of extra equipment.

Indeed, certain 3D visual software technologies, involving depth mapping and parallax mapping, are frequently used in applications such as gaming and virtual reality (VR). These technologies aim to convert existing 2D source material into images with a certain degree of stereoscopic effect, providing viewers with an illusion of depth on conventional 2D display devices. However, these techniques typically present pre-drawn 3D content and often lack the ability to dynamically and personally customize user-specified 2D sources into scenes with 3D effects. Additionally, they may fall short in terms of interactivity with the viewers.

Therefore, it is desirable to have a solution for generating a 3D interactive scene generation.

BRIEF SUMMARY OF THE INVENTION

An embodiment of the present disclosure provides a computer-implemented method for generating a 3D interactive scene. The method includes executing a first process based on a two-dimensional (2D) source image. The 2D source image is loaded from the storage unit. The first process includes the steps of estimating a corresponding depth map for the 2D source image, creating a 3D mesh based on the estimated depth map, and executing the first loop iteratively to present the 3D interactive scene based on head pose information.

In an embodiment, the first loop includes the steps of obtaining head pose information, calculating a set of head coordinates based on the head pose information, constructing a transformation matrix based on the calculated set of head coordinates, projecting each vertex of the 3D mesh onto a screen coordinate of an onscreen image using the transformation matrix, coloring the onscreen image based on texture information corresponding to the 2D source image, and causing a display unit to display the onscreen image.

In an embodiment, the first loop further includes detecting a pause request, pausing the iteration of the first loop and waiting for a resume request in response to the pause request, and resuming the next iteration of the first loop in response to the resume request.

In an embodiment, the pause request is triggered in an event that the area proportion of the onscreen image obscured by windows of other programs exceeds a specified percentage.

In an embodiment, the method further includes executing a second process based on a 2D source video loaded from the storage unit. The second process includes the step of determining whether a depth video corresponding to the 2D source video is stored in the storage unit. In an event that the depth video is stored in the storage unit, the 3D mesh is initialized, and a second loop is executed iteratively to present the 3D interactive scene. In an event that the depth video is not stored in the storage unit, a background inference thread for generating the depth video is started, and the generated depth video is stored in the storage unit.

In an embodiment, the second loop includes the steps of loading a video frame of the 2D source video from the storage unit, loading the corresponding depth frame for the video frame from the storage unit, updating the 3D mesh based on the depth frame, obtaining the head pose information, calculating the set of head coordinates based on the head pose information, constructing the transformation matrix based on the calculated set of head coordinates, projecting each vertex of the updated 3D mesh onto the screen coordinate of the onscreen image using the transformation matrix, coloring the onscreen image based on the texture information corresponding to the loaded video frame, and causing the display unit to display the onscreen image.

In an embodiment, the second loop further includes the steps of detecting a pause request, pausing the iteration of the second loop and waiting for a resume request in response to the pause request, and resuming the next iteration of the second loop in response to the resume request.

In an embodiment, in an event that the depth video is not stored in the storage unit, the second process further includes the steps of starting the background inference thread while initializing the 3D mesh, and executing the second loop iteratively to present the 3D interactive scene based on the head pose information. The second loop further includes the step of determining whether the depth video is stored in the storage unit. In an event that the depth video is stored in the storage unit, the second process proceeds to the step of loading the corresponding depth frame for the video frame from the storage unit. In an event that the depth video is not stored in the storage unit, the second process starts a real-time inference thread to estimate the corresponding depth frame for the video frame.

In an embodiment, the real-time inference thread includes the steps of loading the video frame from the storage unit, estimating the corresponding depth frame for the video frame, and performing intraframe depth stabilization on the estimated depth frame. Meanwhile, the background inference thread includes executing a third loop to estimate the corresponding depth video for the 2D source video, and performing global depth stabilization on the stored depth video. Each iteration of the third loop includes the steps of loading the video frame from the storage unit, estimating the corresponding depth frame, performing intraframe depth stabilization on the estimated depth frame, and storing the stabilized depth frame in the storage unit. The background inference thread, relative to the real-time inference thread, adopts parameter settings with higher accuracy and computational complexity in depth estimation and intraframe depth stabilization.

In an embodiment, the first process further includes the steps of detecting a source-change request, and checking a file format of a user-specified source in response to the source-change request. In an event that the user-specified source is a static image, the first process exits the first loop and loads the static image from the storage unit as another 2D source image. In an event that the user-specified source is a video, the first process switches to the second process where the video is loaded as a 2D source video. Additionally, the second process further includes detecting the source-change request, and checking the file format of the user-specified source in response to the source-change request. In an event that the user-specified source is a video, the second process loads the video frame of the video from the storage unit as the video frame of another 2D source video. In an event that the user-specified source is a static image, the second process switches to the first process where the static image is loaded as a 2D source image.

In an embodiment, the 3D interactive scene is presented as the desktop wallpaper. Additionally, the method further includes acquiring a handle to a desktop wallpaper.

An embodiment of the present disclosure provides a computer system. The computer system includes a storage unit, a display unit, and a processing unit communicable with the storage unit and the display unit. The storage unit stores a 2D source image and a program. The processing unit loads the program from the storage unit to execute the steps of the method described above.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third,", are only for convenience of explanation, and do not imply any precedence relation between one another.

The description for the embodiments the method is also applicable to the embodiments of the computer system, and vice versa.

Embodiments of the present disclosure utilize the principle of motion parallax instead of the binocular parallax utilized by the prior arts. In a broad sense, the scenes are generated based on a 2D source material (which can be either a static image or a video) and user's head pose. As the user moves, changing his/her position relative to the screen and/or changing the posture of head, the scene generated on the display device will be different. Consequently, scenes featuring 3D interactive effects are achieved without the necessity of an autostereoscopic display device or wearable device.

Figure 1A:
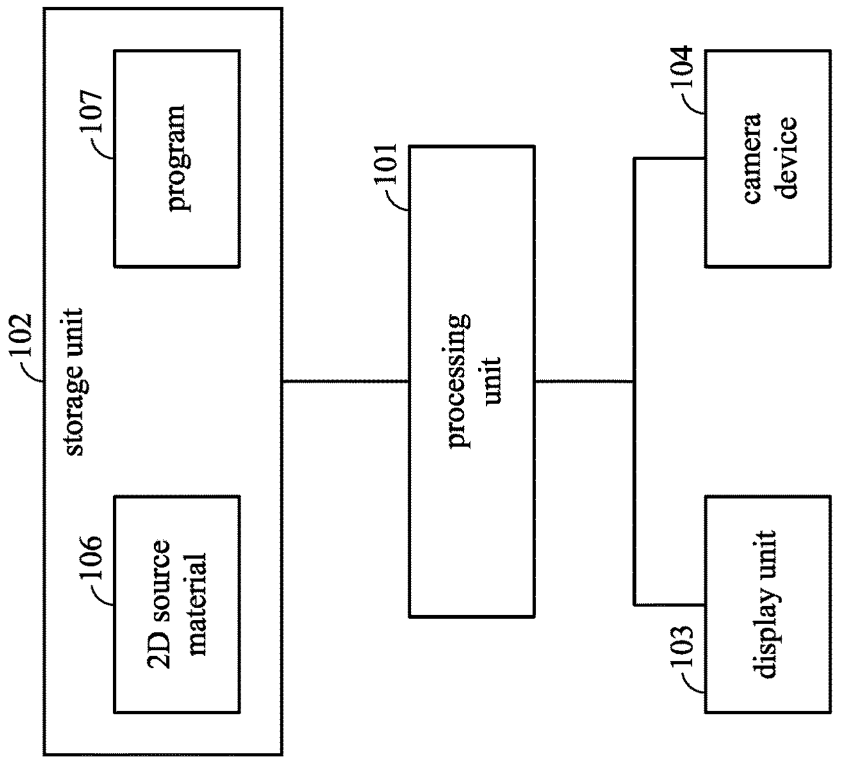
FIG. 1A is the block diagram of the computer system for generating a 3D interactive scene, according to an embodiment of the present disclosure.

FIG. 1A is the block diagram of the computer system 10A for generating a 3D interactive scene based on a 2D source material, according to an embodiment of the present disclosure. As shown in FIG. 1A, elements such as the processing unit 101, the storage unit 102, and the display unit 103, are included in the computer system 10A. Optionally, and the computer system 10A may further include the camera device 104.

The computer system 10A is an electronic device capable of executing computational tasks, such as a personal computer (including desktop computer, laptop computer, tablet computer, etc.), or a server computer.

The processing unit 101 may include one or more general or specialized processors for executing instructions, such as Central Processing Unit (CPU), Graphics Processing Unit (GPU), Neural-network Processing Unit (NPU), microprocessor, microcontroller, Application Specific Integrated Circuit (ASIC), Field Programmable Gate Array (FPGA), System on a Chip (SoC), and/or any combination thereof, but the present disclosure is not limited thereto. The processing unit 101 may further include random-access memory (RAM), such as Dynamic Random-Access Memory (DRAM), Static Random-Access Memory (SRAM), and/or the combination thereof, but the present disclosure is not limited thereto.

The processing unit 101 may communicate with the storage unit 102, display unit 103, and camera device 104 through various wired or wireless communication interfaces, including, but not limited to, system bus, High Definition Multimedia Interface (HDMI), DisplayPort (DP) interface, embedded DisplayPort (eDP) interface, Universal Serial Bus (USB) interface, USB Type-C interface, Thunderbolt interface, Digital Video Interface (DVI), 5th generation mobile networks (5G), Bluetooth, WiFi, near field communication (NFC), etc., but the present disclosure is not limited thereto.

The storage unit 102 can be any device with non-volatile memory, such as Read-Only Memory (ROM), Electrically-Erasable Programmable Read-Only Memory (EEPROM), flash memory, or Non-Volatile Random Access Memory (NVRAM). Examples of such devices include Hard Disk Drive (HDD) arrays, Solid State Drives (SSD), or optical discs, but the present disclosure is not limited thereto. The storage unit 102 may be fully or partially deployed locally (i.e., within the device housing the processing unit 101) or remotely, but the present disclosure is not limited thereto.

According to the embodiments of the present disclosure, the storage unit 102 stores the program 107 and at least one 2D source material 106. The 2D source material 106 can be either a static image or a video, which will be respectively referred to as "2D source image" and "2D source video". The program 107 includes multiple instructions, causing the processing unit 101 to execute the steps of the method 10A for generating 3D interactive scene when loading the program 107 from the storage unit 102.

Figure 1B:
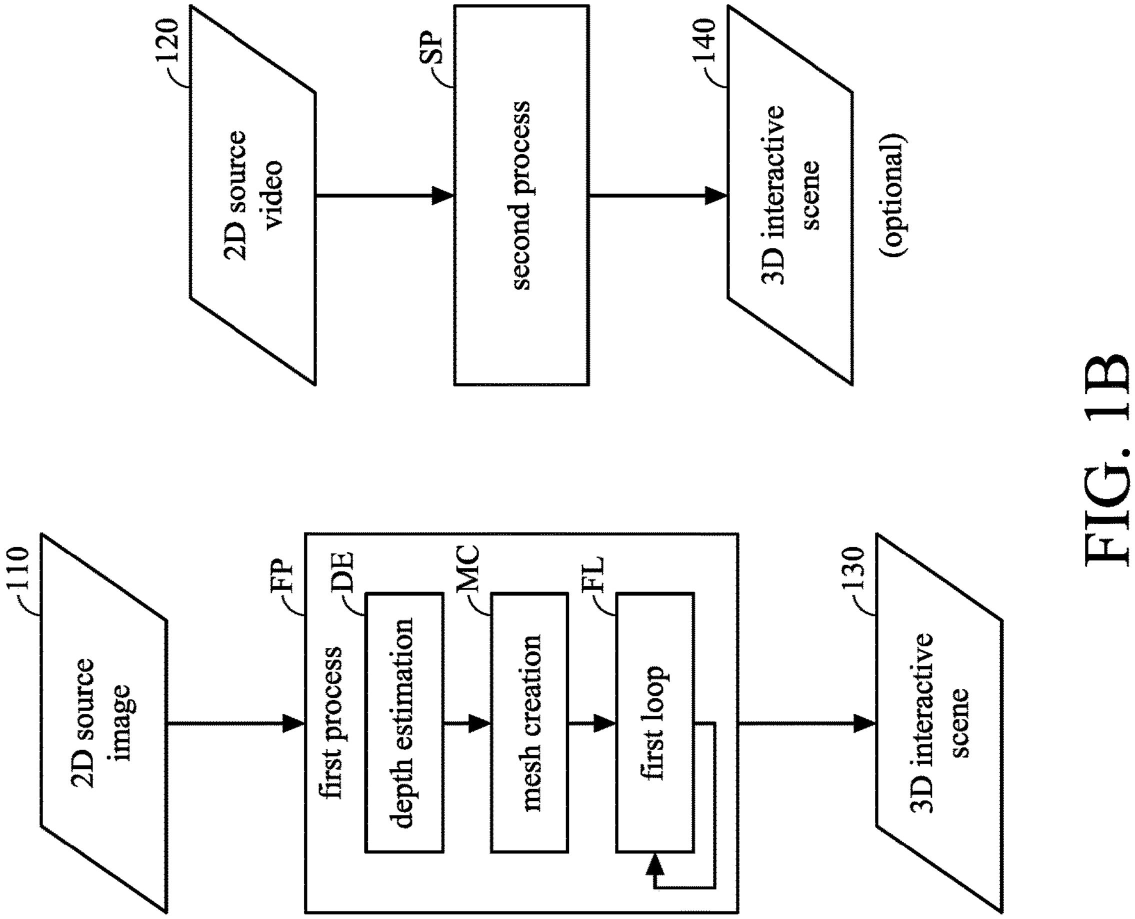
FIG. 1B is the block diagram of the method implemented by the computer system illustrated in FIG. 1A.

FIG. 1B is the block diagram of the method 10B, implemented by the computer system 10A illustrated in FIG. 1A. As shown in FIG. 1B, the method 10B includes executing a first process FP where the 2D source image 110 is loaded from the storage unit 102 as the 2D source material 106, generating in the 3D interactive scene 130 as the output. The first process FP includes three processing stages: the depth estimation DE, the mesh creation MC, and the first loop FL. During the stage of depth estimation DE, a corresponding depth map is estimated for the 2D source image. During the stage of mesh creation MC, a 3D mesh is created based on the estimated depth map. Subsequently, the first loop FL is iteratively executed to present the 3D interactive scene based on the 3D mesh and head pose information. In an optional embodiment, the method 10B may further includes a second process SP where the 2D source video is loaded from the storage unit 102 as the 2D source material 106, generating the 3D interactive scene 140 as the output. More details about the method 10B and the variety of embodiments thereof will be described hereinafter.

Refer back to FIG. 1A. The display unit 103 is used for displaying processed images to present the 3D interactive scenes to viewers. According to the embodiments of the present disclosure, the display unit 103 can be neither an autostereoscopic display unit nor a wearable device (e.g., 3D/VR glasses or headgear), but a conventional display device designed for displaying 2D images.

The camera device 104 may be any device used for photography, such as a depth camera, an RGB camera, or a thermographic camera, employing methods such as normal optical photography or infrared photography. The present disclosure is not limited to specific types of camera devices or photography methods. In an embodiment of the present disclosure, the camera device 104 is used to capture the viewer's image, enabling the acquisition of the viewer's head pose information through head tracking and pose estimation methods such as geometric analysis, genetic algorithms, or machine learning-based approaches.

As previously mentioned, the method 10B provided in the present disclosure may include executing a first process FP for generating a 3D interactive scene based on the 2D source material 106. An embodiment of the first process FP will be elaborated upon in the following with reference to FIG. 2.

Figure 2:
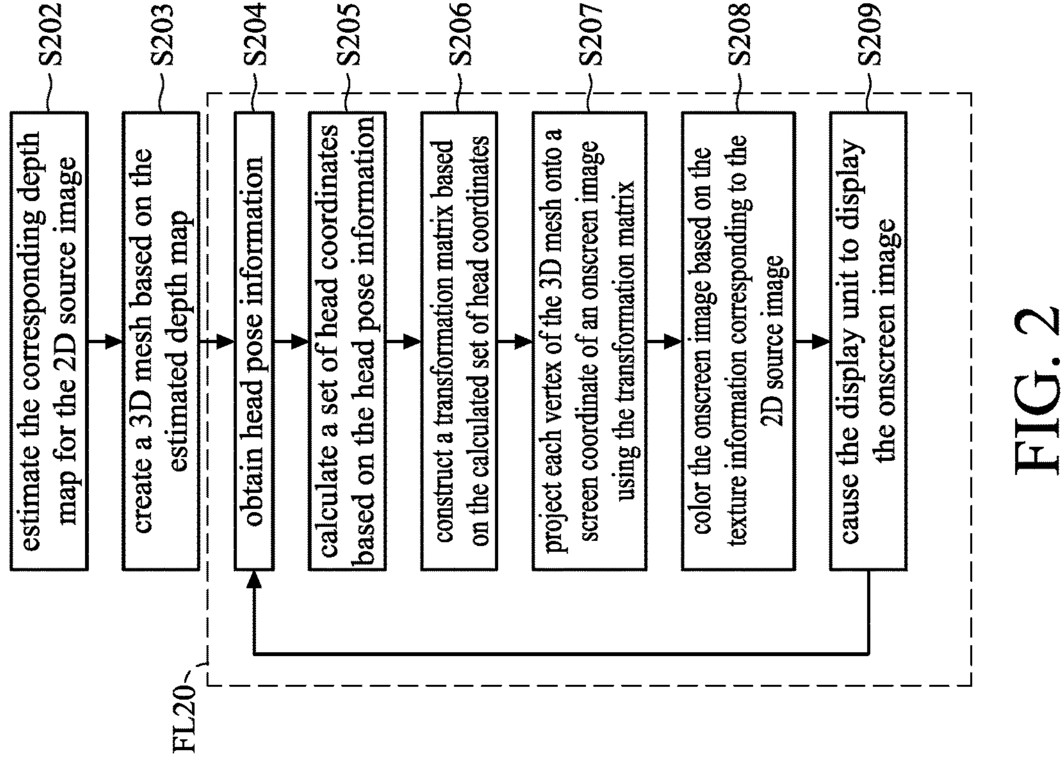
FIG. 2 is the flow diagram of the first process for generating a 3D interactive scene, according to an embodiment of the present disclosure.

FIG. 2 is the flow diagram of the first process FP20 for generating a 3D interactive scene, according to an embodiment of the present disclosure. As shown in FIG. 2, the first process FP20 includes steps S202 and S203 that respectively correspond to the stages of depth estimation DE and mesh creation MC, as well as a first loop FL20 that includes steps S204-S209.

In step S202, the corresponding depth map is estimated for the 2D source image. Then, the first process FP20 proceeds to step S203.

The above-mentioned depth map refers to an image or image channel that contains information relating to the distance of the surfaces of scene objects from a viewpoint. To elaborate further, each pixel value in the depth map represents the estimated depth of the corresponding pixel in the 2D source image. The depth estimation can be achieved through various approaches, such as Shape from Shading (SFS), Shape from Defocus, or machine learning models based on convolutional neural network (CNN) trained by minimizing the regression loss of the estimated depth, but the present disclosure is not limited thereto.

In step S203, a 3D mesh is created based on the estimated depth map. Then, the first process FP20 proceeds to the first loop FL20, starting from step S204.

The creation of the 3D mesh may involve the operation of creating the texture of a triangle formed by three of the mesh vertices that are adjacent to one another. To elaborate further, the mesh may include a plurality of vertices and a plurality of triangles. Each of the triangles is formed by three of the mesh vertices that are adjacent to one another, and has a corresponding texture. When the mesh being created, the texture of each of the triangles, as a type of data structure, will also be created. Said texture may involve various aspects, such as color texture, depth texture, normal texture, specular texture, displacement texture, ambient occlusion texture, emissive texture, and roughness/metalness texture, but the present disclosure is not limited thereto.

In step S204, head pose information of the viewer is obtained. Then, the first process FP20 proceeds to step S205.

The above-mentioned head pose information may involve the position and/or orientation of the viewer's head. Position information, also referred to as "translation", is typically defined by x, y, and z coordinates. Orientation information, also referred to as "rotation", is typically defined by roll, pitch, and yaw angles. Thus, the head pose can involve information up to six degrees of freedom, namely (x, y, z, roll, pitch, yaw). As mentioned earlier, the viewer's head pose information can be obtained through head tracking and pose estimation methods, relying on the viewer's image captured by the camera device 104, but the present disclosure is not limited thereto. In an alternative implementation, head pose information can be acquired using a dedicated head-worn device equipped with motion sensors. In another alternative implementation, mouse tracking can be employed as a substitute for head tracking, meaning that the action of the mouse is used to represent the motion of the viewer's head. For example, in case the head tracking function is unavailable, disconnected, or occupied by other applications, the translation of the head can be represented by ordinary mouse movement, while the rotation of the head can be simulated through drag-and-drop with the mouse.

In step S205, a set of head coordinates is calculated based on the head pose information obtained in step S204. Then, the first process FP20 proceeds to step S206.

In an embodiment, the head pose information obtained in step S204 are represented by world coordinates, while the set of head coordinates are represented by camera coordinates, namely the coordinates of the camera-centered coordinate system. Therefore, a camera matrix consisting of an intrinsic matrix and an extrinsic matrix through matrix multiplication is used in step S205 to map from world coordinates to camera coordinates. The mathematical expression for the camera matrix M is as follows:

$$z_c\begin{bmatrix}u\\v\\1\end{bmatrix}=K[R\ \ T]\begin{bmatrix}x_w\\y_w\\z_w\\1\end{bmatrix}=M\begin{bmatrix}x_w\\y_w\\z_w\\1\end{bmatrix}$$

where M=K[R T]. $x_w$, $y_w$, $z_w$ are coordinates of the source of the light ray (viewer's head in this case) which hits the camera sensor in world coordinates, relative to the origin of the world. These coordinates can be obtained from the head pose information. K is the intrinsic matrix, which contains intrinsic parameters of the specific camera model, encompassing focal length, image sensor format, and the camera principal point. [R T] is the extrinsic matrix, where R and T are the extrinsic parameters which denote the coordinate system transformations from world coordinates to camera coordinates. T is the position of the origin of the world coordinate system expressed in coordinates of the camera-centered coordinate system. R is the rotation matrix. (u, v, zc) are the position information of the viewer's head. Noted that if head tracking is achieved through the use of an RGB camera, u and v are pixel coordinates and zc is fixed. If head tracking is achieved through the use of a calibrated depth camera, then (u, v, zc ) are physical coordinates. Similarly, vector coordinates can be used to calculate the orientation information of the viewer's head through the transformation of camera matrix M.

In step S206, a transformation matrix is constructed based on the calculated set of head coordinates. Then, the first process FP20 proceeds to step S207.

In step S207, each vertex of the 3D mesh is projected onto a screen coordinate of an onscreen image using the transformation matrix constructed in step S206. Then, the first process FP20 proceeds to step S208.

The above-mentioned transformation matrix can be regarded as the camera matrix of a virtual camera and is used to map mesh coordinates (i.e., the coordinates of vertices in the 3D mesh) to screen coordinates (i.e., the coordinates of pixels in the onscreen image). In an embodiment, the transformation matrix consists of a perspective projection matrix, a sensitivity matrix, a translation matrix, and a rotation matrix, through matrix multiplication. The mathematical expression for the transformation matrix My is as follows:

$$\begin{bmatrix}x_s\\y_s\\1\end{bmatrix}=PSR_vT_v\begin{bmatrix}x_m\\y_m\\z_m\\1\end{bmatrix}=M_v\begin{bmatrix}x_m\\y_m\\z_m\\1\end{bmatrix}$$

where $M_v=PSR_vT_v$. ($x_s$, $y_s$) is the screen coordinate in the onscreen image. $R_v$ and $T_v$ are respectively the rotation matrix and the translation matrix, determined by the set of head coordinates calculated in step S205. P is the perspective projection matrix, which controls the field of view and amount of perspective distortion. S is the sensitivity matrix, which is a function for fine-tuning the user experience.

In step S208, the onscreen image is colored based on texture information corresponding to the 2D source image. Then, the first process FP20 proceeds to step S209.

To further elaborate, the coloration for the onscreen image may involve the operation of interpolating color textures of the 2D source image on the onscreen image. The color textures can be represented in a variety of formats of the color space, such as RGB, YUV, YCbCr, CMYK, sRGB, and HSV, but the present disclosure is not limited thereto.

In step S209, the processing unit 101 causes the display unit 103 to display the onscreen image. Then, the first process FP20 returns to step S204, starting the next iteration of the first loop FL20.

The first process FP20 iteratively executes the first loop FL20 to present the 3D interactive scene. To elaborate further, as the viewer changes the head pose, the head pose information obtained in step S204, the set of head coordinates calculated in step S205, and the transformation matrix constructed in step S206 also changes accordingly. As a result, the onscreen image displayed on the display unit 103 varies in response to the viewer changes the head pose, achieving the interactivity with the viewer.

Figure 3:
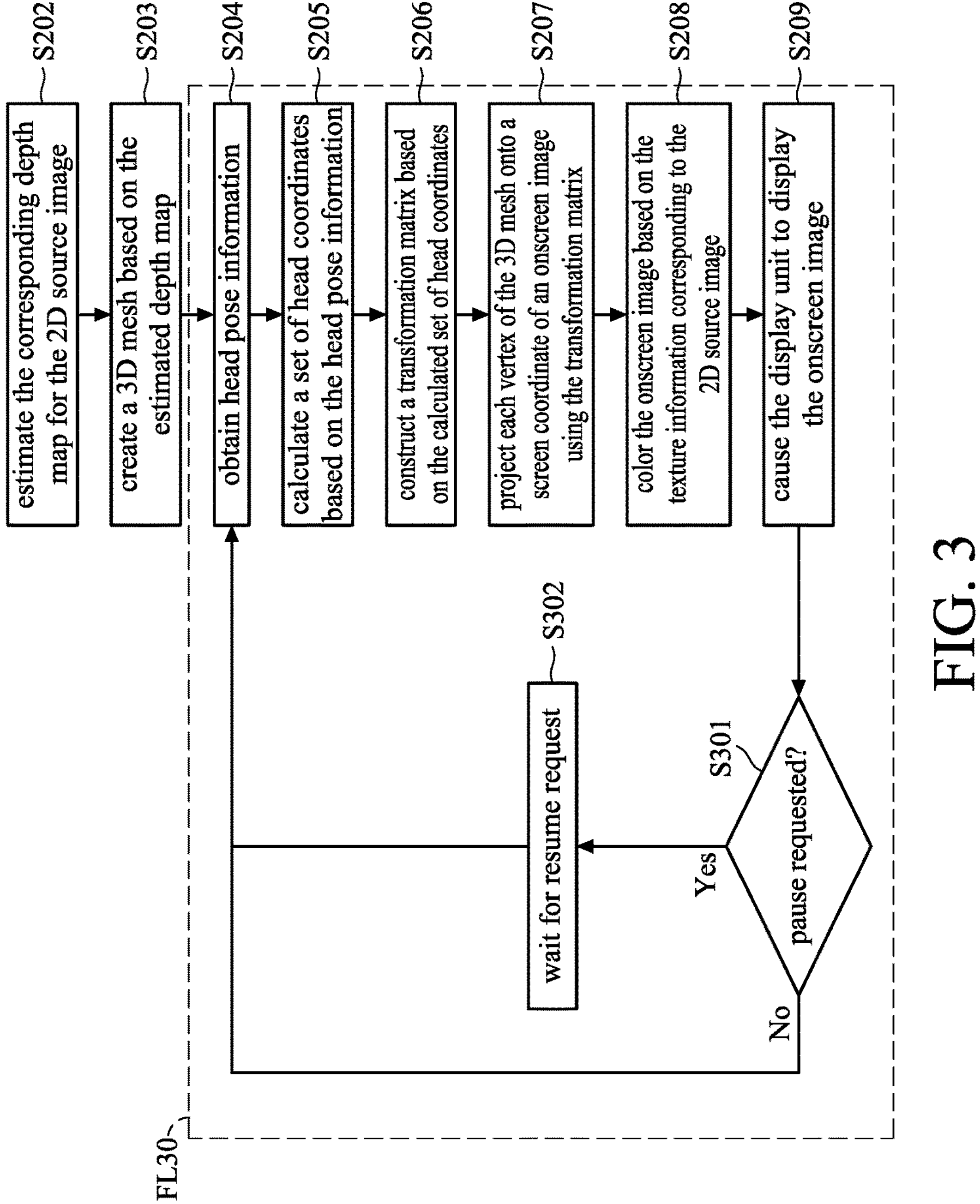
FIG. 3 is the flow diagram of an alternative first process, according to another embodiment of the present disclosure.

FIG. 3 is the flow diagram of an alternative first process FP30, according to another embodiment of the present disclosure. Compared to the first process FP20 illustrated in FIG. 2, the first loop FL30 in the first process FP30 further includes additional steps S301 and S302 succeeding step S209. Otherwise, the steps S202-S209 in FIG. 3 are substantially the same as those in FIG. 2, and thus will not be reiterated herein.

In step S301, the first process FP30 detects a pause request. That is, the first process FP30 determines whether the user requests to pause the presentation of the 3D interactive scene. In response to the detected pause request, the first process FP30 proceeds to step S302. If there is no pause request currently, the first process FP30 returns to step 204, starting the next iteration of the first loop FL30.

In step S302, the first process FP30 pauses the iteration of the first loop FP30, and waits for a resume request. In response to the resume request, the first process FP30 returns to the step S204, resuming the next iteration of the first loop FL30.

The pause request as well as the resume request can be triggered manually or automatically. In an embodiment, the pause request is triggered in the event that the area proportion of the onscreen image obscured by windows of other programs exceeds a specified percentage (e.g., 50% of the entire screen). Alternatively, the pause request is triggered when the battery power is below a specified level (e.g., 30%), in order to save power consumption. Once these conditions are no longer met, the resume request is triggered.

In an embodiment, the 2D source material 106 can be either a static image (i.e., 2D source image) or a video (i.e., 2D source video). This indicates that users can specify the source material for generating the 3D interactive scene as a static image or a video. Consequently, two separate processes, namely the first process FP and the second process SP as illustrated in FIG. 1B, may be needed to generate the 3D interactive scene. Accordingly, there is a need for a mechanism to switch between these processes, and this mechanism will be elucidated with reference to FIG. 4.

Figure 4:
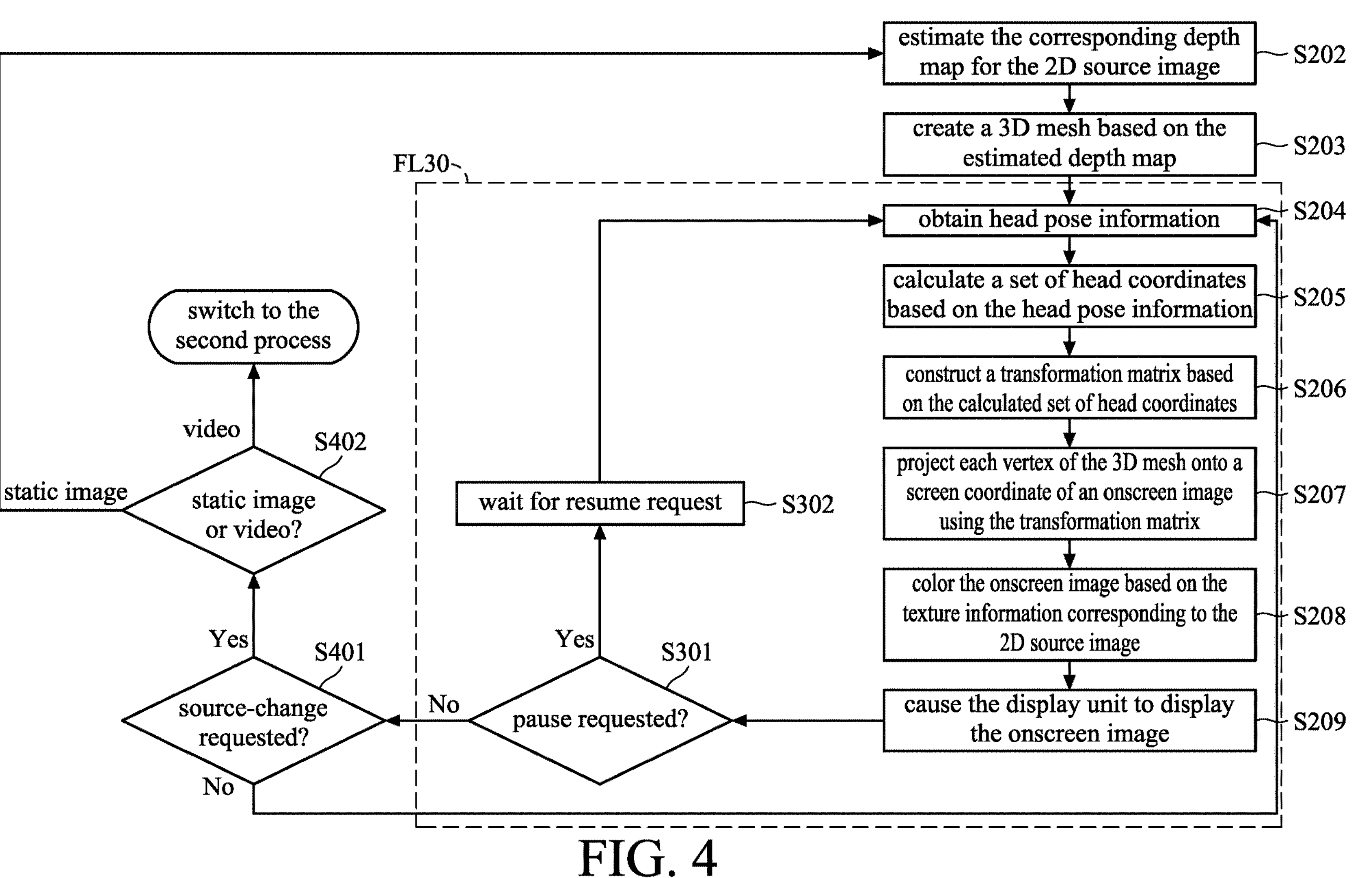
FIG. 4 is the flow diagram of an alternative first process, according to another embodiment of the present disclosure.

FIG. 4 is the flow diagram of an alternative first process FP40, according to another embodiment of the present disclosure. Compared to the first process FP30 illustrated in FIG. 3, the first process FP40 further includes additional steps S401 and S402 succeeding the step S301. Otherwise, the steps S202-S209 in FIG. 4 are substantially the same as those in FIG. 2 and FIG. 3, and thus will not be reiterated herein. Furthermore, it should be noted that S301 and S302 are optional steps in FIG. 4, meaning that the first process FP40 can directly transition from step S209 to step S401, bypassing steps S301 and S302.

In step S401, the first process FP40 detects a source-change request. That is, the first process FP40 determines whether the user requests to change the source material for generating the 3D interactive scene. In response to the source-change request, the first process FP40 proceeds to step S402. If there is no source-change request currently, the first process FP40 returns to step S204, starting the next iteration of the first loop FL30.

In step S402, the first process FP40 checks the file format of the user-specified source (i.e., the source material specified by the user for generating the 3D interactive scene) to determine if the user-specified source is a static image or a video. If the user-specified source is a static image, the first process FP40 exits the first loop FP40, loads the static image from the storage unit as another 2D source image, and returns to step S202 to estimate the corresponding depth map for the new 2D source image. If the user-specified source is a video, the first process FP40 switches to the second process where the video is loaded as the 2D source video. That is, the processing unit 101 exits the first process FP40 and starts the second process where the video is loaded as the 2D source video.

Figure 5:
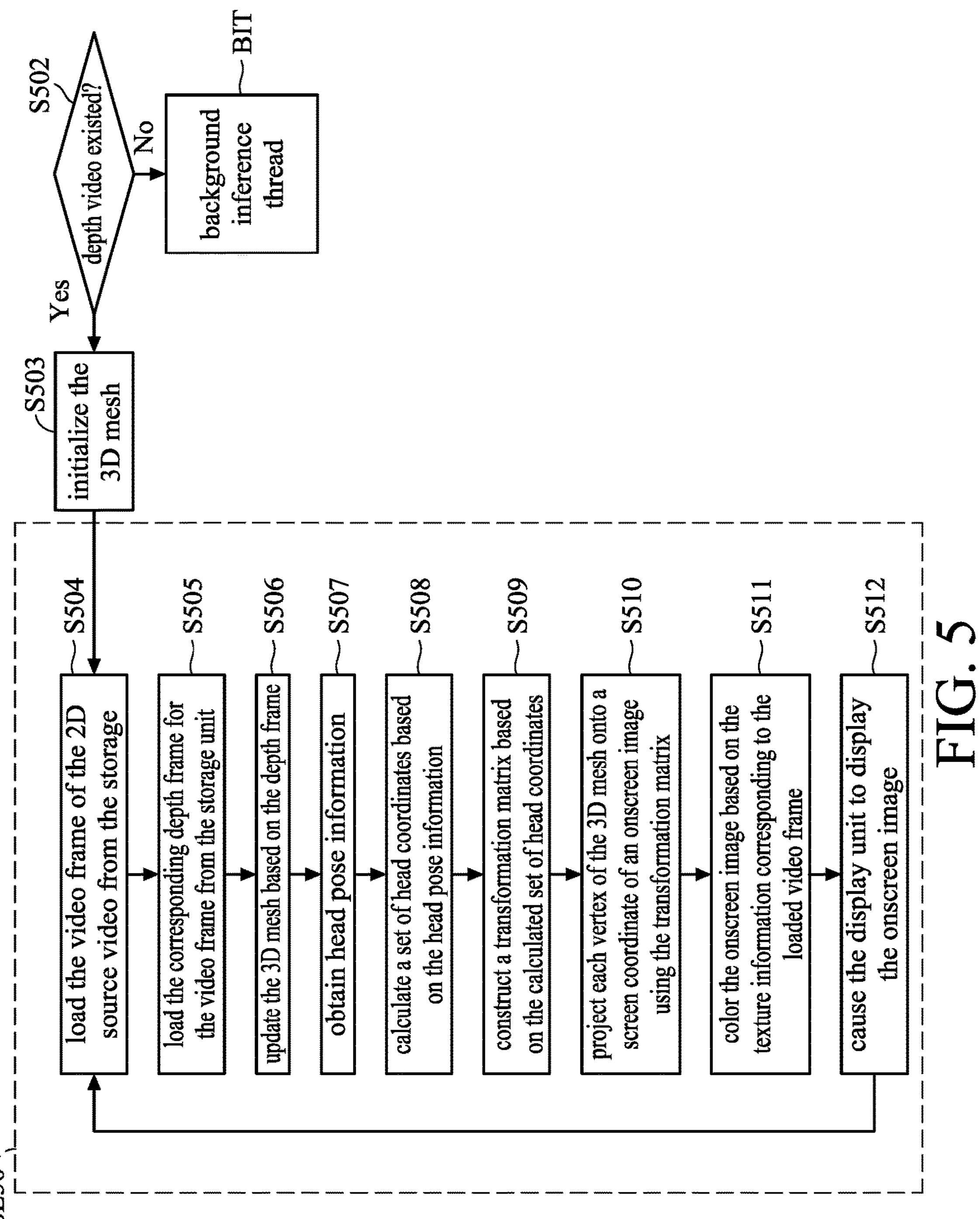
FIG. 5 is the flow diagram of the second process for generating the 3D interactive scene, according to an embodiment of the present disclosure.

FIG. 5 is the flow diagram of the second process SP50 for generating the 3D interactive scene, according to an embodiment of the present disclosure. As shown in FIG. 5, the first process FP20 includes steps S502-S503, a background inference thread BIT, and a first loop SL50 that includes steps S504-S512.

In step S502, the second process SP50 checks the existence of a depth video corresponding to the 2D source video. That is, the second process SP50 determines whether the depth video is stored in the storage unit 102. The depth video includes a depth frame sequence, in which each depth frame is the depth map of a corresponding video frame in the 2D source video. If the depth video is stored in the storage unit 102, the second process SP50 proceeds to step S503. If the depth video has not been stored in the storage unit 102, the second process SP50 starts a background inference thread for generating the depth video and storing the generated depth video in the storage unit.

In step S503, the 3D mesh is initialized. Then, the second process SP50 proceeds to the second loop SL50, starting from step S504.

As mentioned earlier, the 3D mesh can be created based on the depth map. Typically, viewers would prefer to enjoy the 2D source video from the beginning. Therefore, the 3D mesh can be created (or initialized) based on the initial depth frame in the depth video. Alternatively, the 3D mesh can be initialized based on a default depth frame.

In step S504, the video frame of the 2D source video is loaded from the storage unit 102 to the RAM of the processing unit 101 for subsequent processing. Then, the second process SP50 proceeds to step S505.

In step S505, the corresponding depth frame for the video frame is loaded from the storage unit 102 to the RAM of the processing unit 101 for subsequent processing. Then, the second process SP50 proceeds to step S506.

In step S506, the 3D mesh is updated based on the depth frame loaded in step S505. Then, the second process SP50 proceeds to step S507.

In step S507, the head pose information of the viewer is obtained. Then, the second process SP50 proceeds to step S508.

The implementation details of step S507 are substantially the same as those of the previously mentioned step S204, and thus will not be reiterated herein.

In step S508, the set of head coordinates is calculated based on the head pose information obtained in step S507. Then, the second process SP50 proceeds to step S509.

The implementation details of step S508 are substantially the same as those of the previously mentioned step S205, and thus will not be reiterated herein.

In step S509, the transformation matrix is constructed based on the calculated set of head coordinates. Then, the second process SP50 proceeds to step S510.

The implementation details of step S509 are substantially the same as those of the previously mentioned step S206, and thus will not be reiterated herein.

In step S510, each vertex of the updated 3D mesh is projected onto the screen coordinate of the onscreen image using the transformation matrix constructed in step S509. Then, the second process SP50 proceeds to step S511.

The implementation details of step S510 are substantially the same as those of the previously mentioned step S207, and thus will not be reiterated herein.

In step S511, the onscreen image is colored based on the texture information corresponding to the loaded video frame. Then, the second process SP50 proceeds to step S512.

The implementation details of step S511 are substantially the same as those of the previously mentioned step S208, and thus will not be reiterated herein.

In step S512, the processing unit 101 causes the display unit 103 to display the onscreen image. Then, the first process FP20 returns to step S504, starting the next iteration of the second loop SL50. Though not drawn in the figure, it should be appreciated that before entering the next iteration of the second loop SL50, the frame counter should be incremented (e.g., frame_count++), so that the next video frame will be loaded in step S504 instead of the current video frame. If all video frames of the 2D source video have completed one full cycle, then restart from the initial video frame for loading.

Figure 6:
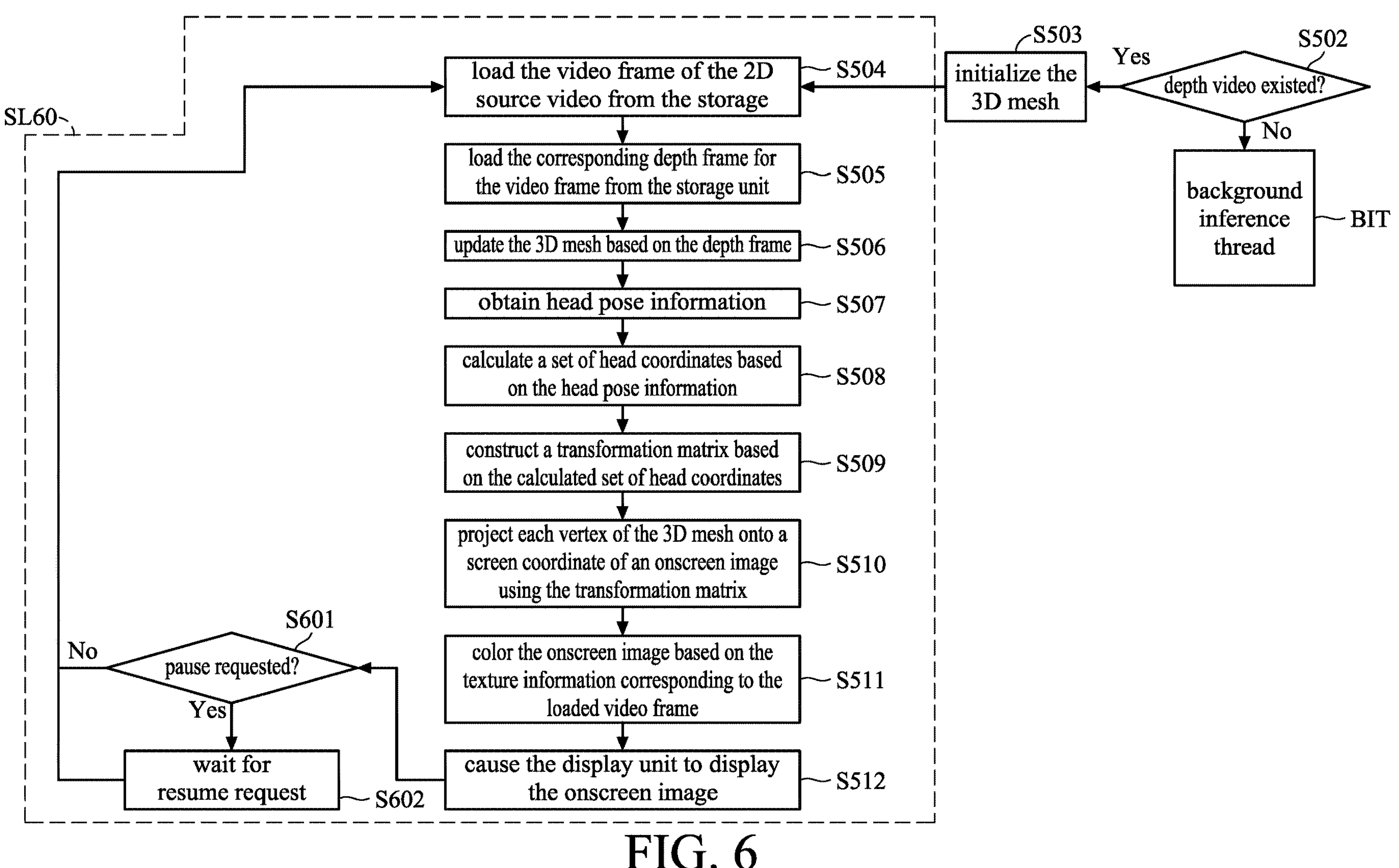
FIG. 6 is the flow diagram of an alternative second process, according to another embodiment of the present disclosure.

FIG. 6 is the flow diagram of an alternative second process SP60, according to another embodiment of the present disclosure. Compared to the second process SP50 illustrated in FIG. 5, the second loop SL60 in the second process SP60 further includes additional steps S601 and S602 succeeding the step S512. Otherwise, the steps S502-S512 in FIG. 6 are substantially the same as those in FIG. 5, and thus will not be reiterated herein.

In step S601, the second process SP60 detects a pause request. That is, the second process SP60 determines whether the user requests to pause the presentation of the 3D interactive scene. In response to the detected pause request, the second process SP60 proceeds to step S602. If there is no pause request currently, the second process SP60 returns to step S504, starting the next iteration of the second loop SL60.

In step S602, the second process SP60 pauses the iteration of the second loop SL60, and waits for a resume request. In response to the resume request, the second process SP30 returns to the step S504, resuming the next iteration of the second loop SL60.

The pause request as well as the resume request can be triggered manually or automatically. In an embodiment, the pause request is triggered in the event that the area proportion of the onscreen image obscured by windows of other programs exceeds a specified percentage (e.g., 50% of the entire screen). Alternatively, the pause request is triggered when the battery power is below a specified level (e.g., 30%), in order to save power consumption. Once these conditions are no longer met, the resume request is triggered.

Figure 7:
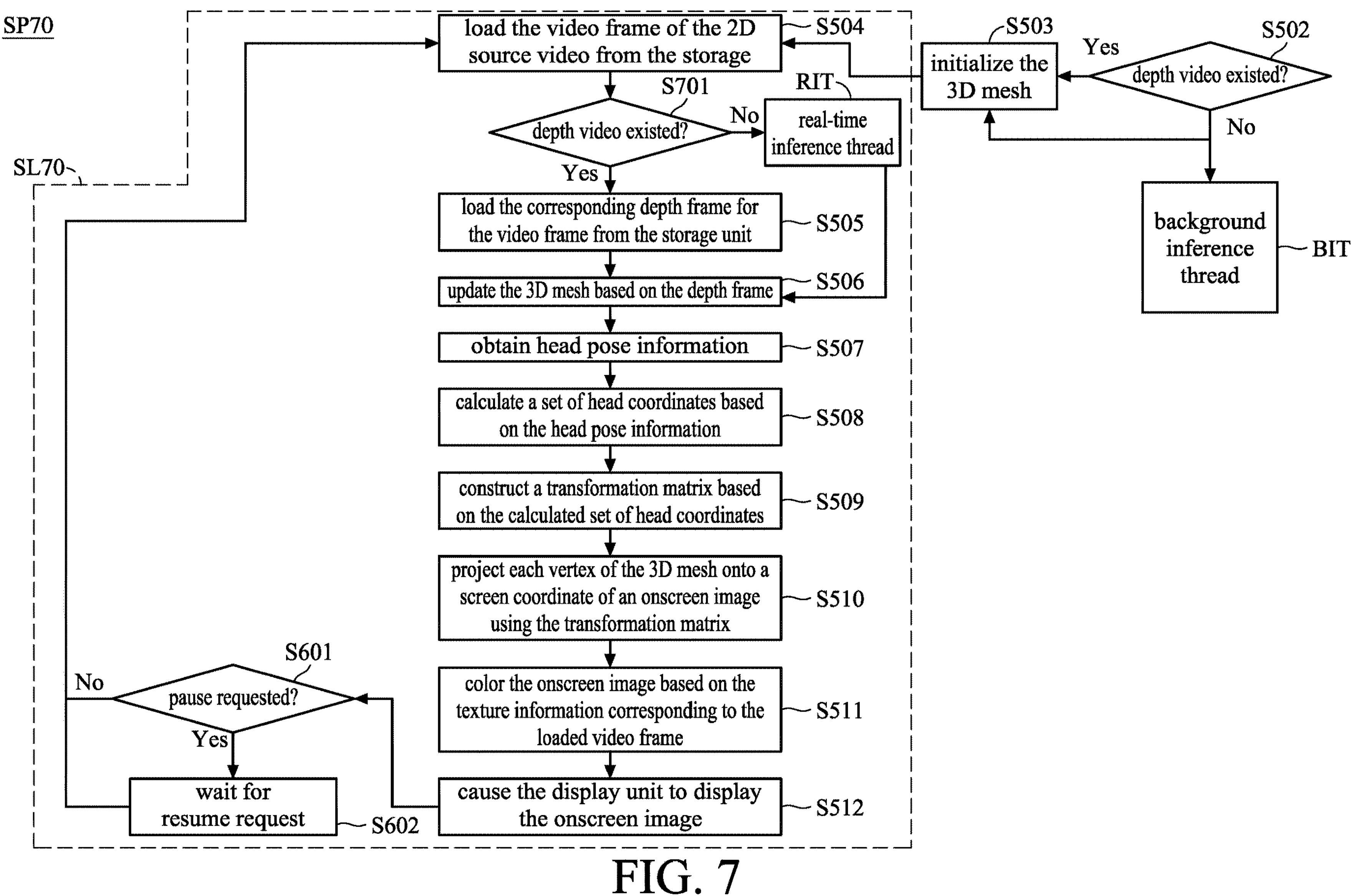
FIG. 7 is the flow diagram of another alternative second process, according to another embodiment of the present disclosure.

FIG. 7 is the flow diagram of another alternative second process SP70, according to another embodiment of the present disclosure. Compared to the second process SP60 illustrated in FIG. 6, the second loop SL70 in the second process SP70 further includes an additional step S701 succeeding the step S504, and a real-time inference thread RIT. Additionally, if it is found in step S502 that the depth video has not been stored in the storage unit 102, the second process SP70 starts the background inference thread BIT while initializing the 3D mesh (step S503), and proceeds to the second loop SL70. This implies that the background inference thread BIT can run concurrently with the second loop SL70 or the real-time inference thread RIT. As for the other steps, they are substantially the same as those in FIG. 5 and FIG. 6 and will not be reiterated herein. Furthermore, it should be noted that S601 and S602 are optional steps in FIG. 7.

In step S701, the second process SP70 checks the existence of the depth video. That is, the second process SP70 determines whether the depth video is stored in the storage unit 102. If the depth video is stored in the storage unit 102, indicating the completion of the generation and storage of the depth video by the background inference thread BIT, the second process SP70 proceeds to step S505. If the depth video has not been stored in the storage unit, indicating that the background inference thread BIT has not yet completed the generation and storage of the depth video, the second process SP70 starts the real-time inference thread RIT to estimate the corresponding depth frame for the video frame. The depth frame, estimated by the real-time inference thread RIT, can subsequently serve as the basis for updating the 3D mesh in step S506.

Figures 8A, 8B:
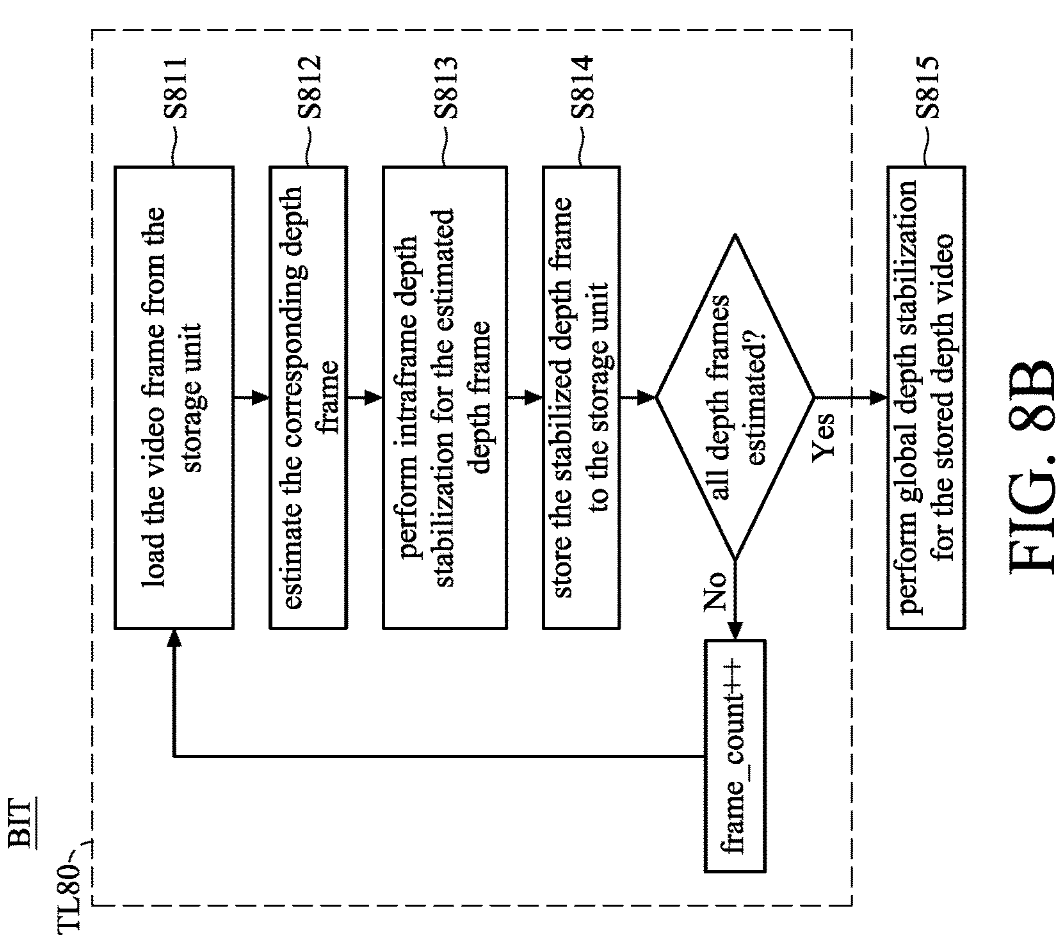
FIG. 8A is the flow diagram of the background inference thread BIT, according to an embodiment of the present disclosure.
FIG. 8B is the flow diagram of the real-time inference thread RIT, according to an embodiment of the present disclosure.

FIGS. 8A and 8B are respectively the flow diagrams of the real-time inference thread RIT and the background inference thread BIT, according to an embodiment of the present disclosure. As shown in FIG. 8A, the real-time inference thread RIT may include steps S801 and S802. As shown in FIG. 8B, the background inference thread BIT may include steps S811-815, in which steps S811-814 are included in the third loop TL80.

First, please refer to FIG. 8A. In step S801 of the real-time inference thread RIT, the corresponding depth frame is estimated for the video frame. Implementation details regarding depth estimation have been described earlier and thus is not reiterated herein. Then, the real-time inference thread RIT proceeds to the step S802.

In step S802 of the real-time inference thread RIT, intraframe depth stabilization is performed for the estimated depth frame. Intraframe depth stabilization aims to enhance the quality and consistency of depth information within a single frame of a sequence. This process involves techniques such as pixel-wise depth filtering and smoothing to reduce noise, eliminate artifacts, and create a more seamless and visually coherent representation of the depth frame. Thereby, the depth frame, after undergoing intraframe depth stabilization, can better serve as the basis for updating the 3D mesh in step S506.

Next, please refer to FIG. 8B. In step S811 of the background inference thread BIT, the video frame is loaded from the storage unit 102 to the RAM of the processing unit 101 for subsequent processing. Then, the background inference thread BIT proceeds to step S812.

In step 812 of the background inference thread BIT, the corresponding depth frame is estimated for the loaded video frame. Implementation details regarding depth estimation have been described earlier and thus is not reiterated herein. Then, the background inference thread BIT proceeds to step S813.

In step 813 of the background inference thread BIT, intraframe depth stabilization is performed for the estimated depth frame. Then, the background inference thread BIT proceeds to step S814.

In step 814 of the background inference thread BIT, the stabilized depth frame is stored in the storage unit 102.

The third loop TL80 are iteratively executed, with each iteration generating and storing the corresponding depth frame for a video frame in the 2D source video. After step S814 and before entering the next iteration, the frame counter should be incremented (e.g., frame_count++), so that the next video frame will be loaded in step S811 instead of the current video frame. When all depth frames are estimated for the entire 2D source video, the background inference thread BIT exits the third loop TL80 and proceeds to step S815.

In step 815 of the real-time inference thread RIT, global depth stabilization is performed for the stored depth video. Unlike intraframe depth stabilization, which focuses on individual frames independently, global depth stabilization considers the temporal coherence and consistency of depth information throughout the entire depth video. This process involves techniques that take into account information from multiple video frames and their interframe relationships, such as temporal filtering or interpolation methods, thereby mitigating fluctuations and inconsistencies in depth across frames.

In contrast to the real-time inference thread, the background inference thread BIT, besides differing in procedural steps, adopts parameter settings that can achieve higher accuracy in depth estimation while incurring higher computational complexity for intraframe depth stabilization. Therefore, the concurrent execution of the background inference thread BIT and the real-time inference thread RIT has a complementary effect, leveraging the respective strengths of both and compensating for each other's shortcomings. More specifically, while the background thread is performing high-quality depth estimation, real-time depth estimation can be initially adopted to generate the 3D interactive scene until the background task is completed. This approach prevents viewers from experiencing long waiting times after specifying the source material for generating the 3D interactive scene.

Figure 9:
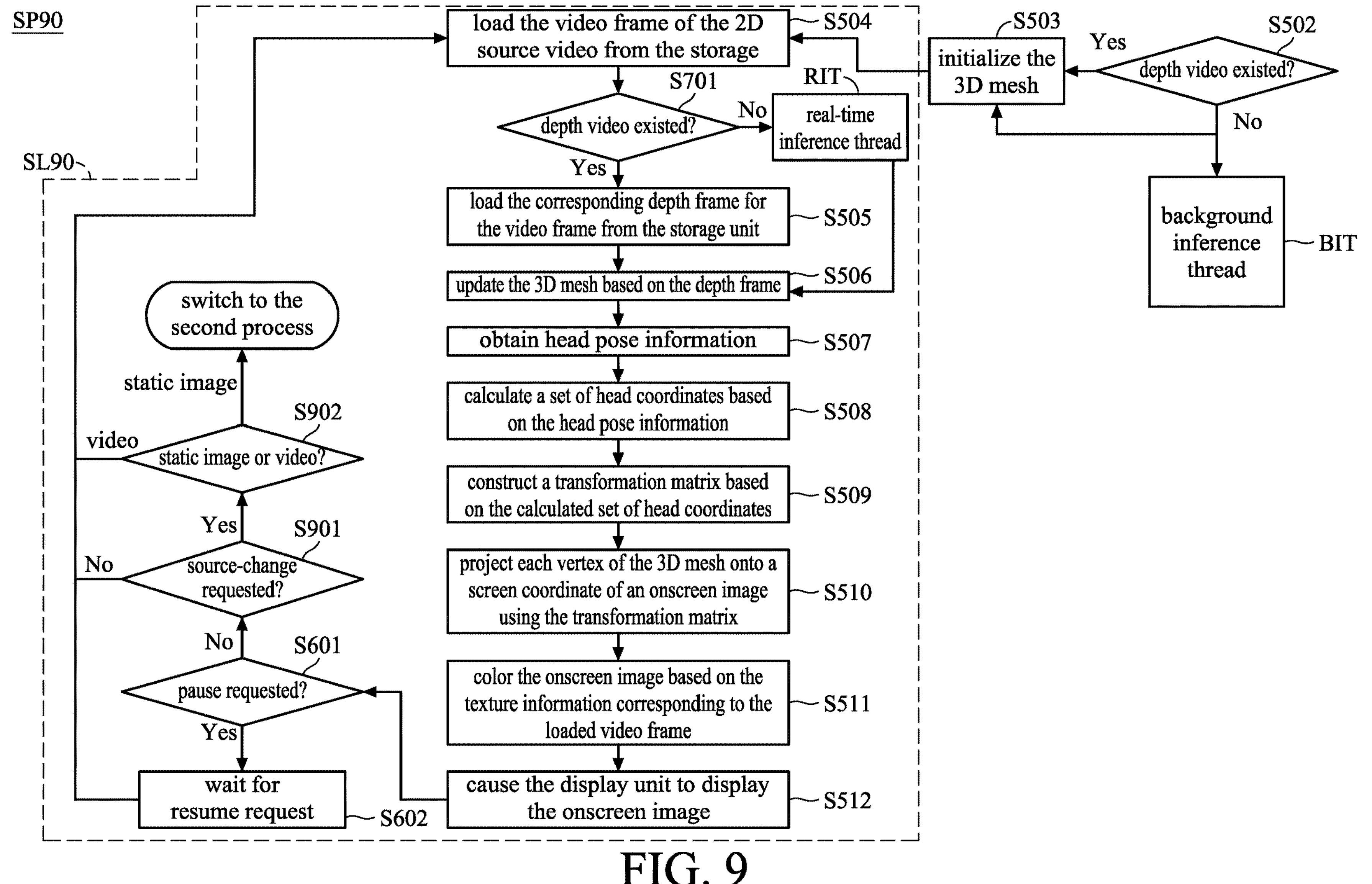
FIG. 9 is the flow diagram of another alternative second process SP90, according to another embodiment of the present disclosure.

FIG. 9 is the flow diagram of another alternative second process SP90, according to another embodiment of the present disclosure. Compared to the second process SP70 illustrated in FIG. 7, the second loop SL90 in the second process SP90 further includes additional steps S901 and S902 succeeding the step S601. Otherwise, the steps S502-S512 in FIG. 9 are substantially the same as those in FIGS. 5-7, and thus will not be reiterated herein. Furthermore, it should be noted that S601 and S602 are optional steps in FIG. 9, meaning that the second process SP90 can directly transition from step S512 to step S901, bypassing steps S601 and S602.

In step S901, the second process SP90 detects a source-change request. That is, the second process SP90 determines whether the user requests to change the source material for generating the 3D interactive scene. In response to the source-change request, the second process SP90 proceeds to step S902. If there is no source-change request currently, the second process SP90 returns to step S504, starting the next iteration of the second loop SL90.

In step S902, the second process SP90 checks the file format of the user-specified source to determine if the user-specified source is a static image or a video. If the user-specified source is a video, the second process SP90 returns to step S504 to load the video frame of the video from the storage unit as the video frame of another 2D source video. If the user-specified source is a static image, the processing unit 101 exits the second process SP90 and starts the first process where the static image is loaded as a 2D source image.

In an embodiment, the 3D interactive scene is presented as a desktop wallpaper. Therefore, the processing unit 101 needs to acquire a handle to the desktop wallpaper before entering the above-described first process or the second process. The handle is a reference or identifier that allows the first process or the second process to interact with and manipulate the desktop wallpaper. By obtaining this handle, the first process or the second process gains the necessary access to apply the generated 3D interactive scene seamlessly onto the desktop background, providing an immersive and dynamic visual experience and enhancing user engagement and interaction.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for generating a three-dimensional (3D) interactive scene, the method comprising:

executing a first process based on a two-dimensional (2D) source image, wherein the 2D source image is loaded from a storage unit; and generating the 3D interactive scene based on the 2D source image, wherein the first process comprises:

estimating a corresponding depth map for the 2D source image;

creating a 3D mesh based on the estimated depth map; and executing a first loop iteratively to present the 3D interactive scene based on the 3D mesh and head pose information; and executing a second process based on a 2D source video loaded from the storage unit, wherein the second process comprises:

determining whether a depth video corresponding to the 2D source video is stored in the storage unit, wherein the depth video comprises a depth frame sequence;

in an event that the depth video is stored in the storage unit, initializing the 3D mesh, and executing a second loop iteratively to present the 3D interactive scene based on the head pose information; and in an event that the depth video is not stored in the storage unit, starting a background inference thread for generating the depth video and storing the generated depth video in the storage unit.

2. The method as claimed in claim 1, wherein the first loop comprises:

obtaining the head pose information;

calculating a set of head coordinates based on the head pose information;

constructing a transformation matrix based on the calculated set of head coordinates;

projecting each vertex of the 3D mesh onto a screen coordinate of an onscreen image using the transformation matrix;

coloring the onscreen image based on texture information corresponding to the 2D source image; and causing a display unit to display the onscreen image.

3. The method as claimed in claim 2, wherein the first loop further comprises:

detecting a pause request;

in response to the pause request, pausing the iteration of the first loop and waiting for a resume request; and in response to the resume request, resuming the next iteration of the first loop.

4. The method as claimed in claim 3, wherein the pause request is triggered in an event that an area proportion of the onscreen image obscured by windows of other programs exceeds a specified percentage.

5. The method as claimed in claim 1, wherein the second loop comprises:

loading a video frame of the 2D source video from the storage unit;

loading the corresponding depth frame for the video frame from the storage unit;

updating the 3D mesh based on the depth frame;

obtaining the head pose information;

calculating the set of head coordinates based on the head pose information;

constructing the transformation matrix based on the calculated set of head coordinates;

projecting each vertex of the updated 3D mesh onto the screen coordinate of the onscreen image using the transformation matrix;

coloring the onscreen image based on the texture information corresponding to the loaded video frame; and causing the display unit to display the onscreen image.

6. The method as claimed in claim 5, wherein the second loop further comprises:

detecting a pause request;

in response to the pause request, pausing the iteration of the second loop and waiting for a resume request; and in response to the resume request, resuming the next iteration of the second loop.

7. The method as claimed in claim 6, wherein the pause request is triggered in an event that an area proportion of the onscreen image obscured by windows of other programs exceeds a specified percentage.

8. The method as claimed in claim 1, wherein in an event that the depth video is not stored in the storage unit, the second process further comprises:

starting the background inference thread while initializing the 3D mesh; and executing the second loop iteratively to present the 3D interactive scene based on the head pose information, wherein the second loop further comprises:

determining whether the depth video is stored in the storage unit;

in an event that the depth video is stored in the storage unit, proceeding to the step of loading the corresponding depth frame for the video frame from the storage unit; and in an event that the depth video is not stored in the storage unit, starting a real-time inference thread to estimate the corresponding depth frame for the video frame.

9. The method as claimed in claim 8, wherein the real-time inference thread comprises:

loading the video frame from the storage unit;

estimating the corresponding depth frame for the video frame; and performing intraframe depth stabilization on the estimated depth frame, wherein the background inference thread comprises:

executing a third loop to estimate the corresponding depth video for the 2D source video; and performing global depth stabilization on the stored depth video;

wherein each iteration of the third loop comprises:

loading the video frame from the storage unit;

estimating the corresponding depth frame;

performing intraframe depth stabilization on the estimated depth frame; and storing the stabilized depth frame in the storage unit;

wherein the background inference thread, relative to the real-time inference thread, adopts parameter settings with higher accuracy and computational complexity in depth estimation and intraframe depth stabilization.

10. The method as claimed in claim 1, wherein the first process further comprises:

detecting a source-change request; and in response to the source-change request, checking a file format of a user-specified source;

in an event that the user-specified source is a static image, exiting the first loop, and loading the static image from the storage unit as another 2D source image;

in an event that the user-specified source is a video, switching to the second process where the video is loaded as the 2D source video, and wherein the second process further comprises:

detecting the source-change request; and in response to the source-change request, checking the file format of the user-specified source;

in an event that the user-specified source is a video, loading the video frame of the video from the storage unit as the video frame of another 2D source video; and in an event that the user-specified source is a static image, switching to the first process where the static image is loaded as the 2D source image.

11. The method as claimed in claim 1, further comprising:

acquiring a handle to a desktop wallpaper, wherein the 3D interactive scene is presented as the desktop wallpaper.

12. A computer system for generating a 3D interactive scene, comprising:

a storage unit, storing a 2D source image, 2D source video, and a program;

a display unit; and a processing unit, communicable with the storage unit and the display unit, loading the program from the storage unit to execute a first process based on the two-dimensional (2D) source image loaded from the storage unit;

wherein the first process comprises:

estimating a corresponding depth map for the 2D source image;

creating a 3D mesh based on the estimated depth map; and executing a first loop iteratively to present the 3D interactive scene based on the 3D mesh and head pose information;

wherein the processing unit further executes a second process based on the 2D source video loaded from the storage unit, wherein the second process comprises:

determining whether a depth video corresponding to the 2D source video is stored in the storage unit, wherein the depth video comprises a depth frame sequence;

in an event that the depth video is stored in the storage unit, initializing the 3D mesh, and executing a second loop iteratively to present the 3D interactive scene based on the head pose information; and in an event that the depth video is not stored in the storage unit, starting a background inference thread for generating the depth video and storing the generated depth video in the storage unit.

13. The computer system as claimed in claim 12, wherein the first loop comprises:

obtaining the head pose information;

calculating a set of head coordinates based on the head pose information;

constructing a transformation matrix based on the calculated set of head coordinates;

projecting each vertex of the 3D mesh onto a screen coordinate of an onscreen image using the transformation matrix;

coloring the onscreen image based on texture information corresponding to the 2D source image; and causing the display unit to display the onscreen image.

14. The computer system as claimed in claim 13, wherein the first loop further comprises:

detecting a pause request;

in response to the pause request, pausing the iteration of the first loop and waiting for a resume request; and in response to the resume request, resuming the next iteration of the first loop.

15. The computer system as claimed in claim 14, wherein the pause request is triggered in an event that an area proportion of the onscreen image obscured by windows of other programs exceeds a specified percentage.

16. The computer system as claimed in claim 12, wherein the second loop comprises:

loading a video frame of the 2D source video from the storage unit;

loading the corresponding depth frame for the video frame from the storage unit;

updating the 3D mesh based on the depth frame;

obtaining the head pose information;

calculating the set of head coordinates based on the head pose information;

constructing the transformation matrix based on the calculated set of head coordinates;

projecting each vertex of the updated 3D mesh onto the screen coordinate of the onscreen image using the transformation matrix;

coloring the onscreen image based on the texture information corresponding to the loaded video frame; and causing the display unit to display the onscreen image.

17. The computer system as claimed in claim 16, wherein the second loop further comprises:

detecting a pause request;

in response to the pause request, pausing the iteration of the second loop and waiting for a resume request; and in response to the resume request, resuming the next iteration of the second loop.

18. The computer system as claimed in claim 17, wherein the pause request is triggered in an event that an area proportion of the onscreen image obscured by windows of other programs exceeds a specified percentage.

19. The computer system as claimed in claim 12, wherein in an event that the depth video is stored in the storage unit, the second process further comprises:

starting the background inference thread while initializing the 3D mesh; and executing the second loop iteratively to present the 3D interactive scene based on the head pose information, wherein the second loop further comprises:

determining whether the depth video is stored in the storage unit;

in an event that the depth video is stored in the storage unit, proceeding to the step of loading the corresponding depth frame for the video frame from the storage unit; and in an event that the depth video is not stored in the storage unit, starting a real-time inference thread to estimate the corresponding depth frame for the video frame.

20. The computer system as claimed in claim 19, wherein the real-time inference thread comprises:

loading the video frame from the storage unit;

estimating the corresponding depth frame for the video frame; and performing intraframe depth stabilization on the estimated depth frame;

wherein the background inference thread comprises:

executing a third loop to estimate the corresponding depth video for the 2D source video; and performing global depth stabilization on the stored depth video;

wherein each iteration of the third loop comprises:

loading the video frame from the storage unit;

estimating the corresponding depth frame;

performing intraframe depth stabilization on the estimated depth frame; and storing the stabilized depth frame in the storage unit;

wherein the background inference thread, relative to the real-time inference thread, adopts parameter settings with higher accuracy and computational complexity in depth estimation and intraframe depth stabilization.

21. The computer system as claimed in claim 12, wherein the first process further comprises:

detecting a source-change request; and in response to the source-change request, checking a file format of a user-specified source;

in an event that the user-specified source is a static image, exiting the first loop, and loading the static image from the storage unit as another 2D source image;

in an event that the user-specified source is a video, switching to the second process where the video is loaded as the 2D source video;

wherein the second process further comprises:

detecting the source-change request; and in response to the source-change request, checking the file format of the user-specified source;

in an event that the user-specified source is a video, loading the video frame of the video from the storage unit as the video frame of another 2D source video; and in an event that the user-specified source is a static image, switching to the first process where the static image is loaded as the 2D source image.

22. The computer system as claimed in claim 12, wherein the 3D interactive scene is presented as a desktop wallpaper; and wherein the processing unit further acquires a handle to the desktop wallpaper.

* * * * *